Jan. 2, 1934.   T. W. PAUL   1,942,217
SLIP CLUTCH
Filed July 20, 1932   2 Sheets-Sheet 1
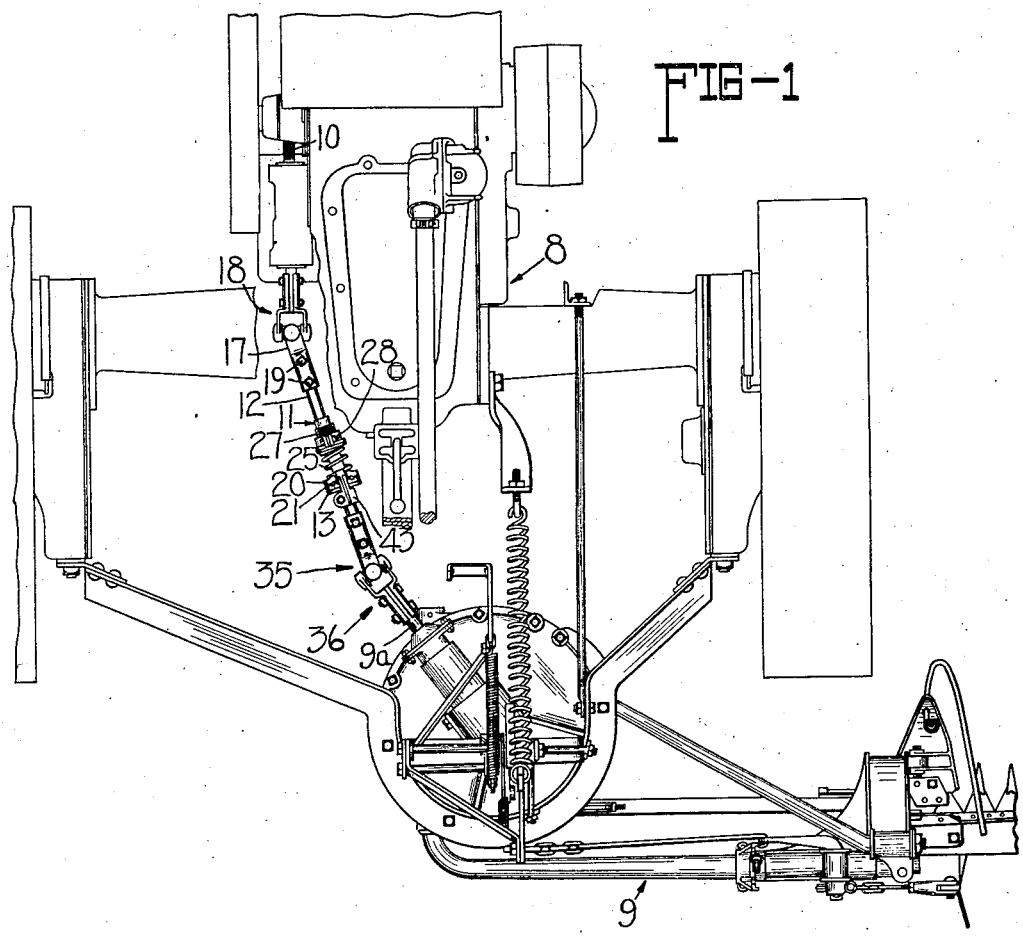
INVENTOR.
Talbert W. Paul,
BY
Brown, Jackson, Boettcher & Dienner.
ATTORNEYS.

Jan. 2, 1934.  T. W. PAUL  1,942,217
SLIP CLUTCH
Filed July 20, 1932   2 Sheets-Sheet 2
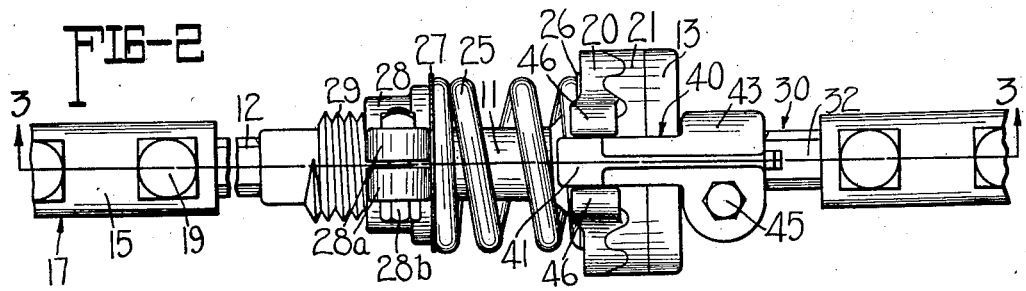
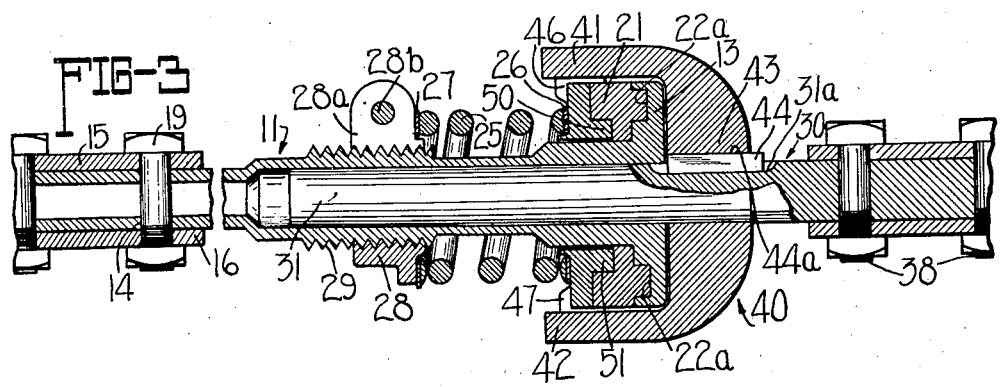
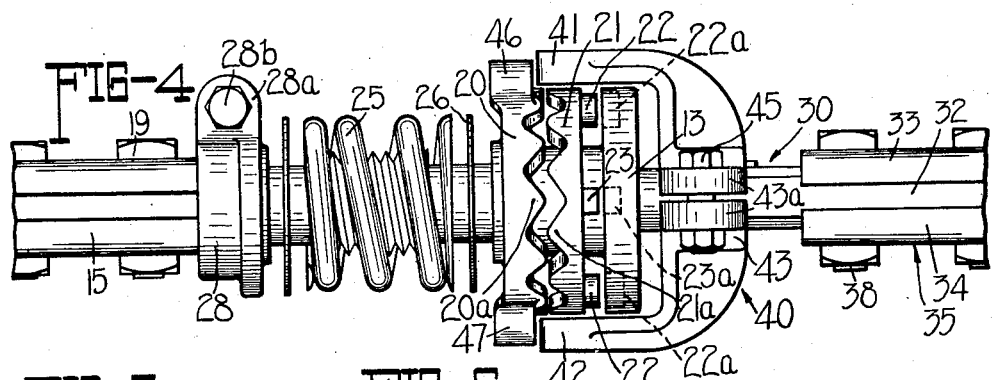
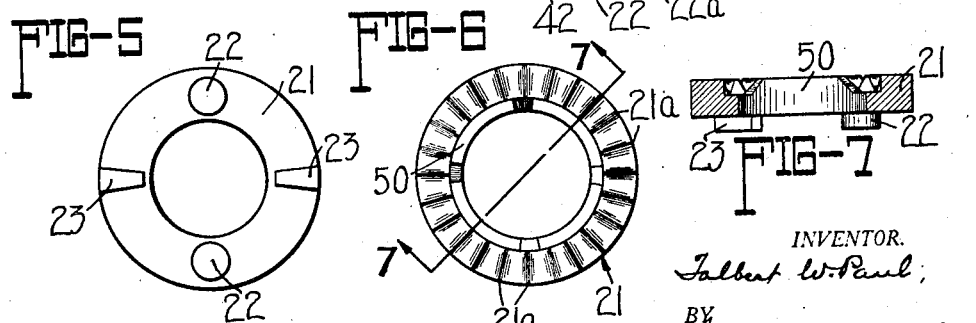
INVENTOR.
Talbert W. Paul;
BY
ATTORNEYS.

Patented Jan. 2, 1934

1,942,217

UNITED STATES PATENT OFFICE 1,942,217

SLIP CLUTCH

Talbert W. Paul, Kansas City, Kans., assignor to Deere & Company, Moline, Ill., a corporation of Illinois Application July 20, 1932. Serial No. 623,465

10 Claims. (Cl. 64—106)

The present invention relates to slip clutches or safety releasing devices, and as certain features of the invention have more particularly to do with the use of such a slip clutch in combination with the driving train from the power take-off shaft of a tractor to the driving shaft of an implement propelled by the tractor, from which driving shaft power is transmitted to the operating parts of an implement propelled by the tractor and wherein the driving train in which the clutch is incorporated extends at an angle to the power take-off shaft, making it necessary to use two universal joints in such train, the slip clutch of the present invention has been illustrated in connection with a mower, the cutter bar of which is operated by power from the power take-off shaft of the propelling tractor.

It is old in the art to provide a slip clutch in the driving train between the power take-off shaft of a tractor and the operating parts of a mower in order to allow the mower to become automatically inoperative when the same encounters obstructions or becomes clogged or choked. However, in the ordinary form of slip clutch with which I am familiar as used in implements of this type, the clutch comprises a pair of interengaging clutching members or rosettes, one of which is fixed to one of the shaft sections while the other is either slidingly mounted on the other shaft section or is fixed thereto with the shaft section itself having telescopic connection with another section to provide for the necessary fore and aft movement when the clutching members slip relative to each other. Such constructions, however, have been found objectionable when used in connection with mowers and other implements, for the reason that in such clutches the sliding connection between one shaft and the clutching member which is movable with respect to that shaft is positioned close to the center of rotation of the shaft, and as the shafts are transmitting their maximum power when the clutching members slip a tremendous frictional resistance is offered against the sliding movement of the clutching member relative to the shaft, thereby making it impossible to give the slip clutch as fine an adjustment as is desired. This frictional resistance varies inversely with the distance of the sliding surfaces from the center of rotation of the shafts,—that is to say, with the same torque transmitted from the driving shaft to the driven shaft, the frictional resistance offered to sliding movement of one shaft relative to the other will be greater near the center of rotation or axes of the shafts, and will diminish proportionately the farther the points of sliding connection are removed from such center of rotation.

Furthermore, so far as I am aware, the slip clutches of the prior art are incapable of use between two universal joints in a driving train extending at an angle from the power take-off shaft of the tractor to the driving shaft of the implement, for the reason that in such a construction, in order to obtain uniform velocity in the driven shaft (the drive shaft of the implement) when positioned at an angle with respect to the power take-off or drive shaft and connected thereto by universal joints, it is not only necessary to use two universal joints, but the forks of the universal joints must be positioned at right angles with respect to each other.

With the above objections in view, therefore, the principal object of the present invention is to provide a slip clutch in which the points of sliding connection between one shaft and the clutching member movable with respect to that shaft are spaced at considerable distances from the center of rotation of the shaft, thereby overcoming the objections noted to prior devices of this type.

Another object of the invention is to provide a driving connection between the periphery of the longitudinally movable clutching member, carried by the driving shaft of the clutch, and the driven shaft, whereby sliding surfaces are obtained between said clutching member and the shaft which are removed a maximum distance from the center of the shaft.

A further object and important feature of the present invention is the provision of a slip clutch capable of being incorporated between two universal joints in a driving train extending at an angle to the power take-off shaft of the tractor as above mentioned.

A still further object of the invention is the provision of mechanism for preventing engagement of the clutch members except at certain angular positions or multiples thereof, whereby when the clutch is employed between two universal joints in a driving train the parts of the clutch can only be so assembled as to cause the forks of the universal joints which are connected to the driving and driven clutch elements, respectively, to be positioned in proper relationship to drive the drive shaft of the implement to which the driven shaft of the clutch is connected by one of said universal joints at a constant velocity.

Other objects and advantageous features will be apparent from the following description of the invention taken in connection with the accompanying drawings in which:

Figure 1 is a top plan view of the rear portion of a tractor to which is attached a mower, and illustrating my improved clutch positioned between two universal joints in the driving train extending at an angle from the power take-off shaft of the tractor to the driving shaft of the mower;

Figure 2 is a top plan view on an enlarged scale of my improved clutch;

Figure 3 is a longitudinal sectional view through the clutch taken on the line 3—3 of Figure 2;

Figure 4 is a side elevational view of the clutch on an enlarged scale with the several parts carried by the driving element of the clutch shown in disassembled relation thereon;

Figure 5 is a rear face view of the clutching member carried and driven by the driving member of the clutch, and illustrating the lugs by which said clutching member is connected to said driving member in a predetermined relative position;

Figure 6 is a front face view of the clutching member shown in Figure 5 illustrating the clutching teeth and the two diametrically opposed cams which are formed in such face; and Figure 7 is a cross-sectional view taken on the line 7—7 of Figure 6.

Referring to Figure 1 of the drawings, 8 indicates the rear portion of a tractor, while 9 indicates the mower which is attached thereto to be drawn thereby. As the tractor and mower of themselves have nothing to do with the present invention and may be of any conventional form now in commercial use, a detailed description thereof is believed to be unnecessary herein. The power take-off shaft of the tractor from which power is derived for operating the cutter bar of the mower is indicated by the numeral 10. The driving shaft of the mower which extends at an angle to the power take-off shaft 10 is indicated by the numeral 9ᵃ.

Referring now more particularly to Figures 2 to 7 of the drawings which illustrate my improved slip clutch in detail, the numeral 11 indicates a member which may be either the driven member or the driving member of the clutch, but which is preferably the driving member and is in the form of an elongated sleeve provided with a squared or non-circular section 12 formed integral therewith at one end and having a flange 13 formed integral therewith at the other end. The squared section 12 of the sleeve is provided with a pair of transversely extending longitudinally spaced holes 14 therein which are adapted to align with holes provided in two members 15 and 16 connected with or comprising the forked member 17 of a front universal joint 18 (see Figure 1). A pair of bolts 19 inserted through said aligned holes firmly secure the section 12 of the sleeve and the member 17 of the universal joint together, as shown.

The clutch also comprises two clutching members or rosettes 20 and 21 which are carried by the sleeve 11. The clutching member 21 is provided with a pair of cylindrically shaped lugs 22 and a pair of tapered lugs 23 on its rear face, the lugs of each pair being spaced diametrically opposite to each other, as shown in Figure 5. The lugs 22 and 23 are adapted to engage in correspondingly shaped recesses 22a and 23a provided in the front face of the flange 13 of the sleeve 11, whereby the clutching member 21 will be locked to the sleeve and turn therewith when the clutch is assembled and driving power is transmitted through the clutch as hereinafter described. The purpose of providing said lugs 22 and 23 engaging in the recesses 22a and 23a will be hereinafter set forth in detail.

The front face of the clutching member 21 is provided with clutching teeth or serrations 21a. The other clutching member or rosette 20 is rotatably journaled on the sleeve 11 and is movable longitudinally thereof. This clutching member also has teeth or serrations 20a which are adapted to engage the teeth 21a on the clutching member 21, whereby the member 20 is driven by the member 21.

The clutching member 20 is held in driving engagement with the clutching member 21 by means of a compression spring 25, one end of which bears against a washer 26 which in turn bears against the front face of the member 20. The opposite end of the spring 25 bears against a washer 27 which in turn bears against the rear face of a nut 28 which is threaded over screw threads 29 provided on the sleeve 11 adjacent the squared section 12. The nut 28 is split on one side, as best shown in Figure 2, and is provided with a pair of spaced laterally extending lugs 28a having aligned openings therethrough for receiving a bolt 28b, whereby, by tightening said bolt, said lugs may be drawn together to lock said nut in any adjusted position on the threads 29, as will be readily understood.

The clutch of the present invention also comprises a shaft 30 which may be either the driving or the driven member of the clutch, but which preferably is the driven member. The shaft 30 is provided with a cylindrically shaped forward section 31 which is telescopically supported within the sleeve 11, and a squared or non-cylindrical rear section 32 to which the members 33 and 34 constituting the spaced arms of the fork 35 of a second or rear universal joint 36 are bolted. For this purpose the shaft 30 is provided with a pair of transversely extending longitudinally spaced holes 37 which are adapted to align with holes provided in the members 33 and 34 and receive clamping bolts 38, whereby the driven member or shaft of the clutch is rigidly secured to the fork 35.

A forked member indicated as a whole by the reference numeral 40 and comprising arms 41 and 42 and a hub portion 43 is keyed to the shaft 30 by means of a key 44 engaging in keyways 44a and 31a formed in the member 40 and the shaft 31, respectively, whereby said forked member rotates said shaft 31 in the power transmitting operation, as hereinafter described. In order to provide against longitudinal movement of the member 40 on the shaft 30, the hub portion 43 of said forked member 40 is split on one side and provided with a pair of laterally extending lugs 43a and a clamping bolt 45 extends through aligned openings provided in said lugs for securely clamping the member 40 to the shaft, as will be readily understood. The fork arms 41 and 42 of the member 40 are spaced diametrically opposite to each other and extend over the flange 13 of the sleeve 11 and also over the rosette or clutching member 21. The outer ends of the fork arms 41 and 42 also extend over the clutching member 20 when its teeth 20a are in engagement with the teeth 21a of the clutching member 21, as shown in Figures 2 and 3, and are adapted to engage between pairs of lugs 46 and 47 extending radially from the periphery of the clutching member 20. As shown, the two pairs of lugs 46 and 47 are disposed diametrically opposite to each other.

The operation of my improved clutch is as follows:—Power is transmitted from the universal joint 18 to the universal joint 36 through the sleeve 11, flange 13, to the clutching member or rosette 21; from the clutching member 21 to the clutching member or rosette 20; from the clutching member 20 through the two pairs of lugs 46 and 47 on the periphery of the clutching member 20 to the arms 41 and 42 of the forked member 40 and thence to the shaft 30 connected to the universal joint 36. When the load on the shaft 30 exceeds the maximum for which the slip clutch is adjusted by the spring 25, the rosette or clutching member 20 is cammed forwardly out of engagement with the clutching member 21. During this forward movement of the clutching member 20 a sliding action occurs between the lugs 46 and 47 and the outer ends of the arms 41 and 42. It is to be noted, however, that the points of contact between these several last named elements are at an appreciable distance from the centers of the driving sleeve 11 and the driven shaft 30, and for this reason the resistance offered to such sliding movement is not appreciable as compared with the resistance offered by the spring 25 to such movement. It will be apparent, therefore, that the slip clutch can be more finely adjusted than is possible in slip clutches where the frictional resistance offered to sliding movement of the movable clutching element is large as compared with the resistance offered to such movement by the spring.

In tractor propelled implements in which the driven parts thereof are operated by power from the take-off shaft of the tractor and wherein it is desirable to position the driving shaft of the implement at an angle to the power take-off shaft, such as in the mower construction illustrated in Figure 1, in order to cause this driving shaft of the implement to have uniform velocity it is necessary not only to place two universal joints in the connection between this shaft and the power take-off shaft of the tractor, but the forks of such universal joints must be positioned in a particular relation, namely, right angles, with respect to each other. For obvious reasons, it has also been found desirable, in constructions of this type, to place the slip clutch in the driving train between the two universal joints. It was therefore found necessary to provide a slip clutch having its parts so arranged that it is impossible to assemble the parts thereof in any other way than such as will cause the forks of the universal joints to be in proper relationship, and, therefore, certain features have been incorporated in the slip clutch of the present invention by which such desired result is attained.

It is to be noted that in the construction of the clutch of the present invention that the section 12 of the sleeve 11 is of squared cross-section and is provided with only the two transverse holes 14 extending therethrough, whereby the members 15 and 16 of the fork 17 can be fixed thereto only in the position shown in the drawings or 180° therefrom. As above mentioned, the clutching member 21 is provided on its rear face with two pairs of lugs 22 and 23, the lugs 22 being dissimilar in shape to the lugs 23, and the lugs of each pair are disposed diametrically to each other, whereby the clutching member 21 can be placed in position with respect to the flange 13 only in the position shown in the drawings or 180° therefrom. If desired, one pair of the lugs may be omitted.

In order that the clutching member 20 may engage with the clutching member 21 either in the position shown or in a position 180° therefrom, the clutching member 21 is provided on its front face between the inner edge thereof and the teeth 21a with cam projections 50 and 51 disposed diametrically opposite to each other as shown. The cam projections 50 and 51 normally engage between similar cam projections 50 and 51 similarly disposed in the rear face of the clutching member 20. In the operation of the clutch, when the clutching member 20 disengages from the clutching member 21, the cam projections 50 and 51 on the member 20 ride up on the cam projections 50 and 51 of the clutching member 21. Said cam projections 50 and 51 will then hold the clutching members out of engagement until those on one clutching member have rotated relative to those on the other clutching member through an arc of 180°, whereupon said cam projections may then engage between the corresponding cam projections on the other clutching member to permit the two clutching members to again engage for driving connection. It will be seen, therefore, that whenever any slippage occurs between the driving and driven shafts of the clutch, they will not again be connected in driving relation to each other until they have rotated through an arc of 180 degrees relative to each other, or a multiple thereof. In the prior patent to Edgar E. Metcalf, No. 1,925,270, dated September 5, 1933, there is disclosed somewhat similar operating mechanism in which patent this subject matter has been claimed broadly.

The forked member 40 can be placed on the shaft 30 in only one position, inasmuch as this member and the shaft are each provided with a single keyway to accommodate the key 44. It is also to be noted that the members 33 and 34 of the universal joint 36 can be connected to the driven shaft 30 of the clutch only in the position shown in the drawings or 180° therefrom, because of there being only one set of transverse holes 38 in the shaft section 32.

By providing the telescoping connection between the members 11 and 30 of the clutch a construction is provided in which the driving connection between the driving and driven elements of the clutch may be disconnected regardless of whether or not the rosettes 20 and 21 slip relative to each other on account of the load on the driven shaft exceeding the maximum for which the slip clutch is adjusted by the spring 25. Such disconnection is effected by relative axial displacement between the driving and driven shaft parts, the displacement required being only that sufficient to free the fork arms 41 and 42 from between the lugs 46 and 47. For example, in some types of mowers it may be desirable to interrupt the drive to the cutter bar should the latter meet with an obstruction and be swung rearwardly. The type of slip clutch connection described above is admirably adapted for such situations because, as stated, a relatively small axial separation of the parts 11 and 30 will be sufficient to free the driving and driven clutch parts. Driving relation may be reestablished by merely moving the parts 11 and 30 toward one another in such angular relation that the fork arms 41 and 42 will engage between the lugs 46 and 47.

Under such conditions where the driving and driven shafts are utilized to transmit driving power in one direction only it may not be necessary to arrange the lugs 46 and 47 in oppositely disposed pairs, it being necessary only to provide two oppositely disposed lugs adapted to contact with one side of the fork arms. In such latter situations driving relation may be re-established by simply bringing the driving and driven clutch parts together, it not being necessary to see that the fork arms engage between lugs of oppositely disposed pairs.

I claim:—

1. A slip clutch mechanism comprising driving and driven shafts, clutching mechanism on one of said shafts comprising two members having coacting serrations on their adjacent surfaces for relative engagement, one of said members being movable longitudinally with respect to said shaft, and a driving connection between the periphery of said last-named member and the other of said shafts comprising a sliding connection.

2. A slip clutch mechanism comprising driving and driven shafts, clutching mechanism on one of said shafts comprising two members having coacting serrations on their adjacent surfaces for relative engagement, one of said members being movable longitudinally with respect to said shaft, and a driving connection between said last-named member and the other of said shafts comprising a pair of radially disposed lugs on the periphery of said last-named member having sliding connection with said last-named shaft.

3. A slip clutch mechanism comprising driving and driven shafts, clutching mechanism on one of said shafts comprising two members having coacting serrations on their adjacent surfaces for relative engagement, one of said members being movable longitudinally with respect to said shaft, and a driving connection between said last-named member and the other of said shafts comprising a pair of radially disposed lugs on the periphery of said last-named member and an arm secured to said last-named shaft and extending laterally and longitudinally thereof with its outer end in sliding engagement between said lugs.

4. A slip clutch mechanism comprising driving and driven shafts, clutching mechanism on one of said shafts comprising two members having coacting serrations on their adjacent surfaces for relative engagement, one of said members being movable longitudinally with respect to said shaft, and a driving connection between said last-named member and the other of said shafts, said driving connection comprising two pairs of spaced lugs extending radially from the periphery of said last-named member, said pairs of lugs being positioned diametrically opposite to each other, and a pair of diametrically disposed fork arms secured to said last-named shaft engaging between the lugs of each pair and having sliding connection respectively therewith.

5. A clutch mechanism for connecting driving and driven shafts comprising a pair of members, one being mounted on each of said shafts, and one of said shafts and the associated member being movable longitudinally with respect to the other shaft, and a driving connection between said members comprising pairs of spaced lugs on one member and extending radially from the periphery thereof, and a pair of fork arms carried by the other member and engageable between the lugs of said pairs, said fork arms adapted to be released from said lugs upon relative longitudinal movement of said shafts.

6. A power transmission mechanism comprising, in combination, alined driving and driven shafts, clutching mechanism on one of said shafts including two members having coacting serrations on their adjacent surfaces for relative engagement, one of said members having rotatable and longitudinal movement on said shaft, means for holding said movable clutch member in clutching engagement under normal driving stress, and means on the periphery of said last named clutch member cooperating and in axial alinement with means carried by the other of said shafts whereby one of said shafts is driven by the other of said shafts.

7. A power transmission mechanism comprising, in combination, driving and driven shafts, clutching mechanism on one of said shafts including two members having coacting serrations on their adjacent surfaces for relative engagement, and releasable mechanism between the other of said shafts and the periphery of one of said members adapted to transmit drive from the former to the latter shaft under normal driving stresses and to be released under abnormal driving stresses.

8. A slip clutch mechanism comprising a driving shaft, a driven shaft, a member mounted on one of said shafts to rotate therewith and having serrations on the side removed from the other shaft, a second member having serrations engaging the serrations of said first member and being movable longitudinally with respect to said one shaft, and a member fixed to said other shaft and embracing said first member and having sliding engagement with said second member whereby said second member may move longitudinally with respect to said second shaft.

9. A slip clutch mechanism comprising driving and driven shafts, clutching mechanism comprising two members having coacting serrations on their adjacent surfaces for relative engagement, one of said members being movable longitudinally with respect to at least one of said shafts, and a driving connection between the radially outer periphery of said last-named member and the other of said shafts comprising a sliding connection.

10. A slip clutch mechanism comprising driving and driven shafts, clutching mechanism comprising two members having coacting serrations on their adjacent surfaces for relative engagement, one of said members being movable longitudinally with respect to at least one of said shafts, and a driving connection between the radially outer periphery of said last-named member and the other of said shafts comprising relatively slidable members disposed radially outwardly of said serrations.

TALBERT W. PAUL.